UNITED STATES PATENT OFFICE.

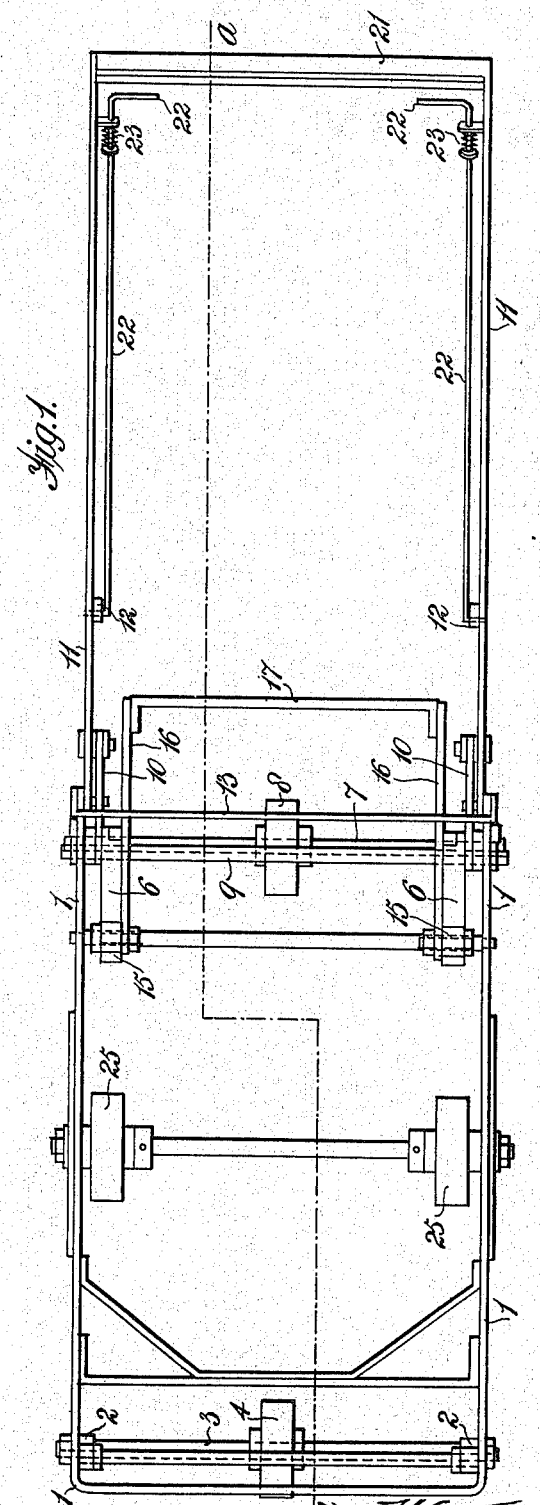

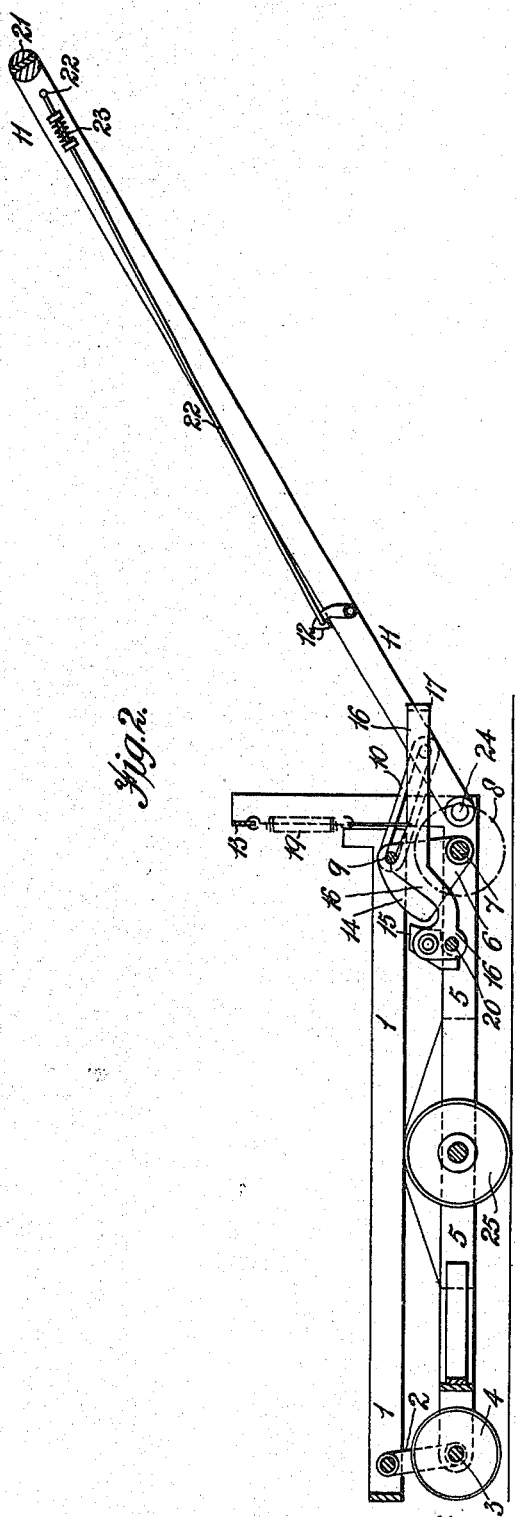

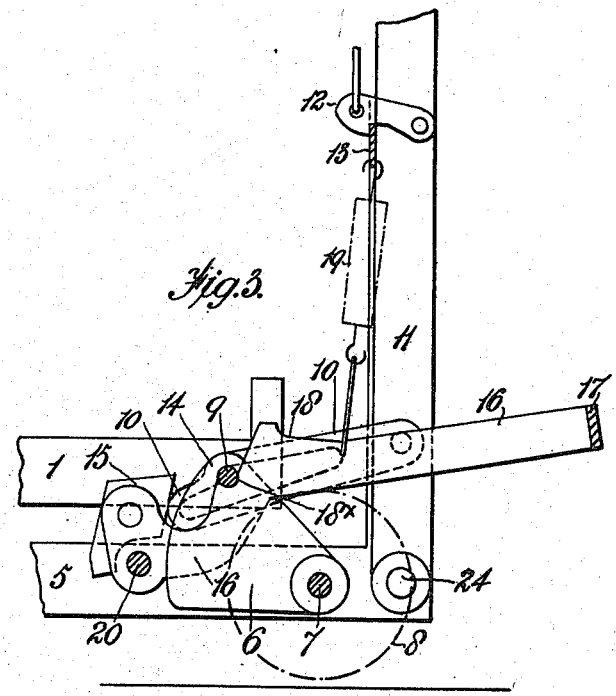

WALTER EDWARD KIMBER, OF LONDON, ENGLAND.

LIFTING TRUCK OR TROLLEY.

1,260,657.

Specification of Letters Patent. Patented Mar. 26, 1918.

Application filed February 7, 1918. Serial No. 215,823.

*To all whom it may concern:*

Be it known that I, WALTER EDWARD KIMBER, a subject of the King of Great Britain, residing at 87 Saint Augustines road, Camden Square, London, England, have invented new and Improved Lifting Trucks or Trolleys, of which the following is a specification.

The present invention is principally intended for application to trucks or trolleys fitted with a floating wheel fore and aft of a slightly smaller diameter than the central pair of wheels on which the carriage or frame of the truck is supported, so as to permit of the turning of the truck in its own length, and it consists in the construction and arrangement hereinafter described of the means for raising and lowering the platform or part to receive the goods which art required to be transported from one position to another, in relation to such carriage or frame.

In the accompanying drawings:—

Figure 1 is a plan view of the truck or trolley constructed according to my invention.

Fig. 2 a vertical section on the line *a—a* Fig. 1, and

Fig. 3 an elevation drawn to a larger scale and showing the check or brake action for controlling the descent of the platform and a slight modification of the lifting mechanism for producing the lift in two (or more) steps or stages.

In these drawings 1 is the top frame or elevating platform to receive the goods and which at its rear end is carried by pivoted side links 2 mounted on the axis 3 of the aft floating wheel 4 of the carriage or frame 5 of the truck, and at its fore end by pivoted side links 6 mounted on the axis 7 of the fore floating wheel 8 of such carriage or frame, so that the turning of said links 2 and 6 in one direction or the other will raise or lower the platform in relation to said carriage 5.

At its fore end the platform 1 is fitted with a transverse bar 9 engaging a slotted link 10 the forward end of which is pivoted to a lever 11, the lower end of which is hinged to the front of the carriage or frame 5. The lever 11 is fitted with a spring actuated latch 12 which, by engaging an upward extension 13 of the fore end of the carriage or frame 5 of the truck, serves to retain the lever 11 when turned to its upright position, and allows the truck to be manipulated as a push truck.

Each of the links 6 connecting the elevating platform to the axis 7 of the fore floating wheel 8 of the truck carriage 5 is formed with a quadrantal surface 14 constituting a brake block, but which is made slightly eccentric to the axis 7 on which same is mounted. A brake shoe 15 is mounted on a lever 16 on each side, one end thereof being pivoted at 20 to the carriage or frame 5 of the truck, while its forward free end projects outward, and the two ends are connected by a cross bar 17, constituting a pedal for the application of pressure thereto. The upper surface of the lever 16 is formed with a recess, or notch or tooth 18, which when the elevating platform 1 is in its raised position, by engaging the transverse bar 9 at the forward end of said platform, acts as a retaining stop and prevents the turning of the forward links 6 and the consequent descent of the platform 1 with its load. A spring 19 is arranged to hold the lever 16 in its raised position with the surface of the brake shoe 15 it carries clear of the quadrantal brake block 14, and with the notch or tooth 18 of said lever in engagement with the transverse rod 9 of the platform 1.

Pressure of the foot on the pedal 17 of the brake by depressing the forward ends of the levers 16 against the action of the spring 19 acting thereon, will effect the disengagement of the notch 18 acting as a retaining stop from the transverse bar 9 of the platform 1, and at the same time bring the under surface of the shoe 15 upon the brake block 14 with the required pressure to retard the descent of the platform 1, and which the eccentricity of said block 14 will continuously tend to assist as it turns downward on the axis 7 on which it is pivoted. By suitably reducing the pressure on the pedal 17 of the brake the gradual descent of the platform 1 with its load will be controlled as required.

The raising of the truck handle 11 to a vertical position will carry the link 10 pivoted thereto back along the transverse bar 9 at the front of the platform 1, the slot with which such bar engages permitting of said backward movement, and when the platform 1 is allowed to descend, it will carry the rear end of the link downward with it.

The engagement of the latch 12 with the upwardly projecting part 13 of the frame 5 will retain the handle 11 in its raised position and enable the truck to be moved about like a push truck, and when it has been run under the goods to be lifted, the hands holding the top bar 21 by grasping the upper bent ends of the rods 22 may raise the catches 12 against the action of the springs 23, and so release the handle 11. By then turning handle 11 downward on its bottom hinge 24, the slotted link 10 it carries will pull the transverse bar 9 of the platform 1 forward, and through the side links 2 and 6 raise said platform until its transverse bar 9 passes over and engages the notch or tooth 18 on the upper side of the lever 16, actuating the brake shoe 15, over which it rides, and so retain the platform in its raised position until the brake lever 16 is again depressed by pressure of the foot on the pedal 17 thereof.

In dealing with trucks intended for raising and transporting considerable weights, in order to enable same to be easily manipulated by persons of even slight strength without any undue exertion, as shown in Fig. 3 the slotted link 10 carried by the handle 11 of the truck may be advantageously formed with a plurality (two being shown) of engagement surfaces, which may be successively brought into operation for acting on the transverse bar 9 fitted at the forward end of the platform 1, and the top of the brake lever 16 be provided with a corresponding number of notches or teeth 18, 18*, to retain said bar 9 during the backward movement of the link 10 for each fresh engagement therewith. On the first forward movement of the handle 11 the bottom of the slot of the link 10 will by acting on the transverse bar 9 of the platform 1 carry same forward and upward until the engagement of said bar 9 with the first notch 18* on the upper surface of the brake lever 16 occurs, which will allow the handle 11 to be moved back and by carrying the link with it to the position shown in Fig. 3 cause the succeeding intermediate lifting surface of said slot to engage such transverse bar 9; when a further movement of the handle 11 will impart a further upward movement to the bar 9 and to the elevating platform 1 until said bar engages the second notch 18 in brake lever 16, so as to retain the platform 1 in its highest position. When required to lower the platform 1 the application of pressure to the pedal 17 as before described will depress the lever 16 and so disengage rod 9 from the notch 18 therein, and at the same time bring the brake shoe 15 into contact with the brake block 14 with the pressure necessary to control the descent of said platform 1.

As above stated the mechanism described is principally intended for application to trucks or trolleys fitted with floating wheels fore and aft (8 and 4), and a central pair of supporting wheels (28) but same might also be applied to trucks fitted with pairs of wheels mounted at each end of the carriage or frame thereof.

What I claim as my invention, and desire to secure by Letters Patent, is:—

1. A lifting truck comprising a carriage, a movable platform mounted on said carriage and provided at its fore end with a transverse rod, links connecting said platform with said carriage, a handle pivoted to said carriage at the fore end thereof, a slotted link connecting said transverse rod with said handle, a lever pivoted on said carriage and provided with a stop adapted to engage said rod to hold said platform in elevated position, and a spring tending to maintain said lever in raised position, said lever extending forward and constituting a pedal for releasing said stop from said rod and allowing the platform to descend.

2. A lifting truck comprising a carriage, a movable platform mounted on said carriage and provided at its fore end with a transverse rod, links connecting said platform with said carriage, a handle pivoted to said carriage at the fore end thereof, a slotted link connecting said transverse rod with said handle, a lever pivoted on said carriage and provided with a stop adapted to engage said rod to hold said platform in elevated position, a spring tending to maintain said lever in raised position, said lever extending forward and constituting a pedal for releasing said stop from said rod and allowing the platform to descend, and means for automatically locking said handle in vertical position.

3. A lifting truck comprising a carriage, a movable platform mounted on said carriage and provided at its fore end with a transverse rod, links connecting said platform with said carriage, a handle pivoted to said carriage at the fore end thereof, a slotted link connecting said transverse rod with said handle, a lever pivoted on said carriage and provided with a stop adapted to engage said rod to hold said platform in elevated position, a spring tending to maintain said lever in raised position, said lever extending forward and constituting a pedal for releasing said stop from said rod and allowing the platform to descend, and a brake mechanism connected with said pivoted lever and operative when the said lever is depressed to retard the descent of said platform.

4. A lifting truck comprising a carriage, a movable platform mounted on said carriage and provided at its fore end with a transverse rod, links connecting said platform and carriage, one of said links having a brake surface, a handle pivoted to said carriage at the fore end thereof, a slotted link connecting said transverse rod with said handle, a lever pivoted on said carriage and provided with a stop adapted to engage said rod to hold said platform in elevated position, a brake shoe mounted on said lever and adapted to engage said brake surface, and a spring tending to maintain said lever in raised position, said lever extending forward and constituting a pedal for releasing said stop from said rod and allowing the platform to descend.

5. A lifting truck comprising a carriage, a movable platform mounted on said carriage and provided at its fore end with a transverse rod, links connecting said platform with said carriage, a handle pivoted to said carriage at the fore end thereof, a slotted link connecting said transverse rod with said handle, a lever pivoted on said carriage and provided with a plurality of stops adapted to engage said rod successively, and a spring tending to maintain said lever in raised position, said lever extending forward and constituting a pedal for releasing said stops from said rod and allowing the platform to descend.

In testimony whereof I have signed my name to this specification in the presence of two subscribing witnesses.

WALTER EDWARD KIMBER.

Witnesses:
 CHAS. A. ALLISON,
 W. J. FERRY.